Feb. 27, 1934.         J. DE LA CIERVA         1,949,296
                    AIRCRAFT WITH ROTATIVE WINGS
                    Filed June 25, 1931    4 Sheets-Sheet 1

INVENTOR
                                    JUAN DE LA CIERVA
                              BY
                                        ATTORNEYS

Feb. 27, 1934.  J. DE LA CIERVA  1,949,296
AIRCRAFT WITH ROTATIVE WINGS
Filed June 25, 1931    4 Sheets-Sheet 3

INVENTOR
JUAN DE LA CIERVA
BY
ATTORNEYS

Feb. 27, 1934. J. DE LA CIERVA 1,949,296
AIRCRAFT WITH ROTATIVE WINGS
Filed June 25, 1931 4 Sheets-Sheet 4

INVENTOR
JUAN DE LA CIERVA
BY
Synnestvedt & Lechner
ATTORNEYS

Patented Feb. 27, 1934

1,949,296

UNITED STATES PATENT OFFICE 1,949,296

AIRCRAFT WITH ROTATIVE WINGS

Juan de la Cierva, Madrid, Spain, assignor to Autogiro Company of America, Philadelphia, Pa., a corporation of Delaware Application June 25, 1931. Serial No. 546,680

19 Claims. (Cl. 244—19)

This invention relates to aircraft with rotative wings, and particularly to the construction of the sustaining rotors and rotor-mounting means of such aircraft; the invention having relation especially to the obtaining of proper balance and stability of the craft by the inherent construction and arrangement of the rotor and its mounting means, both per se and also with relation to the body and other parts of the craft.

One of the primary objects of the invention is the provision of improved mounting means for the positioning and securing of the rotative wing system upon the body of the aircraft, which means, while of relatively small size and presenting little resistance to the atmosphere, shall yet be simple and rugged in construction, easily manufactured, and readily inspected.

Another important object is the utilization of the mounting means for the rotative wing system or rotor to effect advantageous operation of the rotor and of the aircraft as a whole, from the standpoint of aerodynamics, balance, and control; and this phase of the invention contemplates the inherent arrangement of the rotor mounting means in such manner with respect to the rotor blades, their common rotational axis member, the body of the craft, and supplemental fixed lifting surfaces thereof, as to coordinate the operation of these various elements in a novel and useful way, and to compensate for certain operating characteristics of the pivoted or displaceable blade type of rotor, including the normal tendency of such rotor blades, particularly in forward flight, to assume different angular positions with respect to the rotational axis at different points in their rotation, considered both fore and aft and laterally of the machine, especially the latter.

I have found, in machines of the type just above described, that the average lift line, passing generally upwardly through the axle of rotation, under certain flight conditions, and particularly during forward flight, does not coincide with the axial line of the rotor axle or axis member, and further, that such asymmetric disposition of the lift line with respect to the physical axis of rotation, is angularly displaced, under such flight conditions, both fore and aft and laterally, the lateral displacement or angularity of the lift line being to one side or the other according to whether the rotor blades are normally arranged for rotation clockwise (viewed in plan) or counter-clockwise. I have further found that, for the best balance and operation of the craft, it is desirable, when employing an engine for forward propulsion which turns the propeller counter-clockwise (viewed in front elevation), to arrange the leading edge of the rotor blades in such manner that the rotor (in plan) rotates counter-clockwise. This arrangement of the rotational directions of the engine and rotor has apparently proved to be quite a simple means of compensating, at least in part, for normal engine torque, when employing only a single engine; the automatic variation in position or displacement of the blades on the two sides, respectively advancing and retreating with relation to the line of flight, with the resultant difference in direction of centrifugal pull upon the horizontal articulating pivot axes disposed at either side of the common axis, apparently producing this desirable effect.

As above indicated, this arrangement of rotational directions of the engine and the rotor, coupled with the normal variations in vertical flapping or displacement of the blades, in normal forward flight, produces certain variations of the normal lift line with respect to a normal vertical line through the physical axis of rotation. For best results, particularly in operation of the rotor, and to cut down to some extent, or at least to average, the twist or couple in planes which include the physical axis of rotation, I propose to set or fix the actual physical axis of rotation at an angle to the vertical, preferably both laterally and longitudinally of the craft. Laterally considered, the physical axis is inclined with respect to the vertical in such manner that the average position of the virtual axis of rotation produced by the irregular angularity of the blades in forward flight more nearly coincides with the vertical through the center of gravity than it otherwise would. If the actual axis is positioned vertically there appears to be a tendency to tip the machine in the direction in which the virtual axis is inclined, and by virtual axis is here meant an axis approximately perpendicular to a plane arranged at substantially equal average distance from the blades as they cone up irregularly in their advance and retreat with respect to the line of flight. Longitudinally considered, the axis is inclined slightly upwardly and rearwardly, in a manner hereinafter more fully considered.

More specifically, the invention contemplates the attaining of better balance and stability in forward flight, with resultant reduction in the amount of aileron or other control to be exerted by the pilot, automatic compensation for engine torque, and possibly other advantages, by correlating the rotational directions of rotor and propeller and by predeterminedly fixedly setting the physical axis on the craft at an angle to a true perpendicular with respect to a plane including the lateral and longitudinal axes of the craft. The invention further contemplates this arrangement of the actual axis by a construction of the rotor head or axis structure itself, preferably together with the supporting or mounting pylon and apex structure thereof so as to establish a fixed predetermined inclination, or, if desired, inclination and offset, of the physical axis of rotation with respect to a central vertical line through the craft.

I preferably also so construct and arrange the pylon legs, and the angularity thereof, with respect to their common apex joint and the fuselage, that the average lift line of the rotor shall lie in a position substantially equispaced, on the average, between the several legs of the pylon construction, so as to equalize the lifting and other stresses on the various legs of the pylon; and further, so that the lines of the legs (extended) approximately intersect at or above the center of the hub.

The foregoing objects and advantages, together with others which may be incident to the invention, are apparent from the following description, reference being had to the accompanying drawings, in which drawings

Figure 4a is a slight modification of the arrangement of Figure 4;

Figure 5 is an enlarged fragmentary showing of a preferred form of the upper part of the pylon construction and the lower part of the rotor head construction; the left half of the view showing the rotor head in section and the right half showing it in elevation.

These drawings involve a construction in which the rotation of the engine and the rotation of the rotor are clockwise, viewed respectively in front elevation and in top plan.

Figure 1:
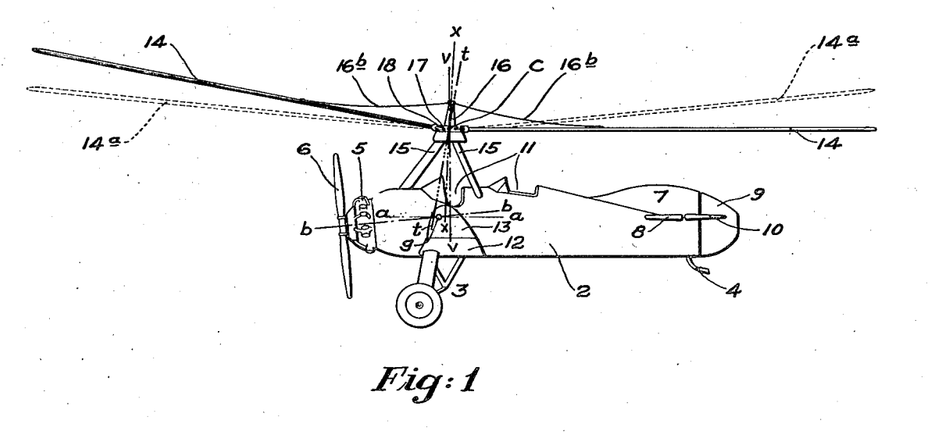
Figure 1 is a somewhat diagrammatic side elevational view of an aircraft in accordance with the present invention, the craft being illustrated as being in forward flight.
Figure 2:
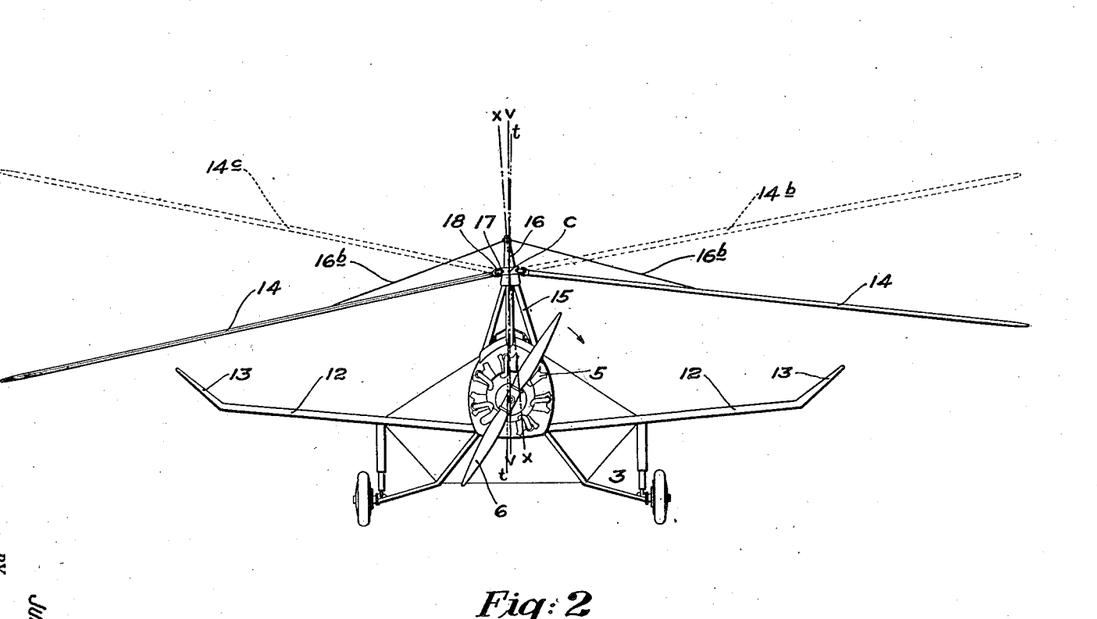
Figure 2 is a somewhat diagrammatic front elevation of the same.

By reference first to Figures 1 and 2, it will be seen that I have illustrated an aircraft having a fuselage 2, alighting mechanism 3, 4, propulsion mechanism including an engine 5 and tractor propeller 6, fixed vertical and horizontal fins 7 and 8, rudder and elevator 9 and 10, cockpits 11, small fixed wings 12 which preferably have upturned tips 13, and rotative sustaining wings or blades 14 which are mounted on the body by means of pylon legs 15, preferably on a freely rotative axis or hub member 16, and on horizontal and vertical pivot pins 17 and 18, so that the blades may be freely rotated, and displaced or swung, by relative air-flow. In the more or less diagrammatic showing of Figures 1 and 2, I have shown a three leg pylon (described and claimed in my copending application, Serial No. 497,745, filed November 24th, 1930) in which the forward leg is centrally disposed with respect to the fuselage, and the two rear legs are disposed one toward each side of the fuselage. In the detail construction of the other views of the drawings, I show a four leg pylon, but the principles of the present invention are substantially the same, regardless of the number of legs forming the pylon structure.

If it be assumed that the craft in Figure 1 is moving forwardly, in cruising attitude, with its central longitudinal axis $a$—$a$ disposed substantially horizontally, the line of thrust $b$—$b$ of the propeller passing substantially through the center of gravity $g$ of the ship (in accordance with my copending application, Serial No. 432,773, filed March 3rd, 1930), the blades 14 will assume different positions, upwardly and downwardly, at different points in their rotation. The full line showing of the rear blade 14 indicates approximately the position which the blade takes under the action of lift, inertia and other forces in flight when it is extending approximately longitudinally rearwardly during its rotation, in forward flight, and the full line showing of the forward blade 14 indicates its approximate position, vertically considered, when it is at that point of its rotation.

In vertical descent, however, the blades at the same two points in their rotation would normally be positioned, vertically considered, approximately at the locations indicated by the dotted line showings 14a, 14a. The upward average lift line of the rotor, in vertical descent will approximate the physical axis of the central rotational hub, which latter, if set vertically, causes the lift line (during vertical descent) to coincide with the vertical line $v$—$v$. However, whether the physical axis of rotation is set coincident with a vertical line or not, there appears to be, during forward flight, an inclination of the virtual axis of rotation upwardly and rearwardly with respect to a true vertical, due to the pivoting of the blades, the positions of their pivots, and the forward displacement of the center of pressure on the rotor considered as a whole; and the blades will be pulling upon their horizontal pivot axes 17, and thus on the rotor head with some twist with respect to the rotor axis, said twist or "couple" being in a longitudinal vertical plane containing the axis of rotation. I therefore initially set the physical axis $x$—$x$ of the rotor at a slightly rearwardly and upwardly inclined angle with respect to the vertical $v$—$v$ which latter is perpendicular to the central longitudinal axis $a$—$a$ of the craft, and I further position the rotor longitudinally of the body at such a point that the center of gravity $g$, of the craft as a whole, lies close to, and preferably slightly ahead of the actual tilted axis $x$—$x$.

In forward flight the average lift line $t$—$t$ of the rotor will be inclined somewhat more than the physical inclination of the axis $x$—$x$, because of the forward displacement of the center of pressure and for other reasons as above stated, so that it will fall close to and somewhat ahead of the center of gravity $g$ of the craft. Thus it will be seen that, considered longitudinally of the craft, I attain the foregoing advantages and at the same time maintain the desired rotor disc incidence (as originally disclosed in my Patent No. 1,590,497, issued June 29th, 1926). Since the average lift line of the rotor, in vertical descent, falls very nearly on the line $x$—$x$, which is now located near the virtual axis; and since the average lift line of the rotor, in forward flight, lies at a still greater inclination, as indicated at $t$—$t$, and since I so offset the center $c$ of the rotor head with respect to the center of gravity $g$ of the craft as a whole, that the lines $x$—$x$ and $t$—$t$ fall respectively slightly behind and ahead of the center of gravity, I am enabled to obtain substantial longitudinal balance in all attitudes of flight, from cruising attitude to an attitude of vertical descent; and further, the tendency of the craft when flying forward under power will be to maintain a substantially level or slightly climbing attitude, and the tendency of the craft, in vertical descent, as for instance without power, will be to nose downward slightly and thus preserve a balance such that forward movement may be readily attained, if desired, when descending without engine power.

Figures 3, 6:
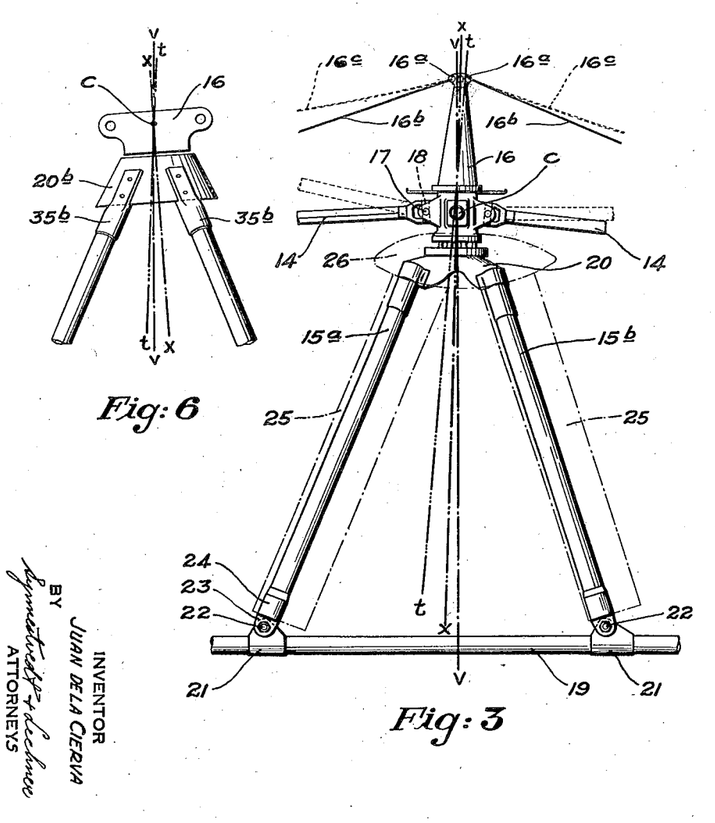
Figure 3 is an enlarged left side elevational view, in more detail, of the rotor head and pylon construction and portions of the fuselage and of the rotor blades.
Figure 6 is a view, somewhat similar to Figure 4a, of another modification.

Referring still to Figure 1, I so locate the forward leg or legs 15 of the pylon, and the rear leg or legs thereof, that the average lift line falls substantially midway between said forward and rear legs. In Figure 3, which is on a larger scale, the lines $v$—$v$, $x$—$x$ and $t$—$t$ are shown more clearly as to their angles, the divergence of the lines being exaggerated, however, in order to bring out the points involved. Figure 3 shows the inner ends of the blades 14, at rest, and brings out the difference in normal angularity thereof to the longitudinal line of the fuselage longeron 19, which difference in angularity is built into the hub and/or pylon construction, by the setting of the actual axis $x$—$x$ at an inclination to the vertical $v$—$v$. The upward and rearward inclination is in this instance effected by setting the rotor hub or axis member 16 at an angle on the apex 20 of the pylon.

The apex itself serves as a mount for the rotative hub 16 and also involves certain novel and advantageous features, per se, later to be considered. As here shown (in Fig. 3) the cone or apex 20 is mounted on and secures together, at their upper ends, the forward and rear legs 15$a$ and 15$b$ of the pylon. As will be readily seen, the distance between the point of attachment of the front leg 15$a$ to the longeron 19 and the point of intersection of the vertical $v$—$v$ and the longeron is greater than the distance between the point of attachment of the rear leg 15$b$ to the longeron 19 and the point of intersection of the line $v$—$v$ and the longeron, so that the axial line $x$—$x$ and the line $t$—$t$ (which is the lift line in forward flight) lie, on the average, midway between the two legs and their points of attachment to the fuselage. The attachment of the pylon legs to the fuselage is by means of the ears 21 and the removable bolts 22 which pass through said ears and through lugs or ears 23 of sleeves 24 in which the lower ends of the pylon legs are secured. Thus the pylon and rotor as a whole may be readily removed and replaced. I further provide streamline fairings or shells 25 for the pylon legs and 26 for the apex member.

Figure 4:
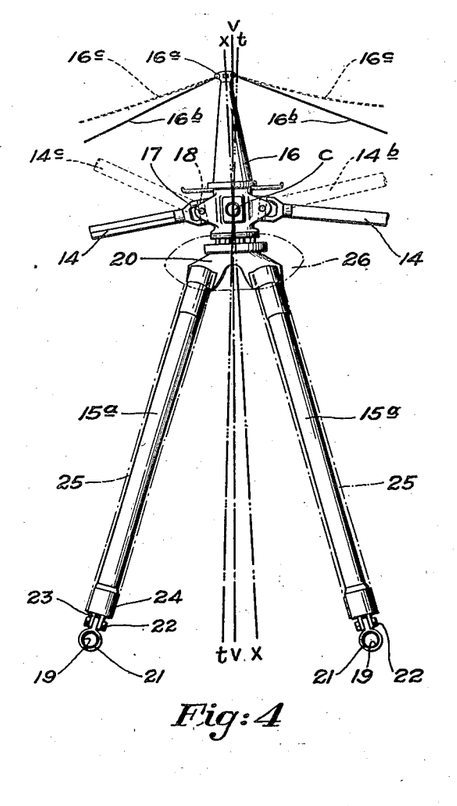
Figure 4 is a front elevational view of the construction shown in Figure 3.

In addition to the particular longitudinal inclination just described, an important feature of the invention involves a lateral inclination of the physical axis of rotation $x$—$x$, as indicated in Figures 2 and 4. Since, as before stated, these figures are front elevational views of the pylon and rotor head construction, and since the blades 14 are rotating clockwise (viewed in plan), the blade 14 shown at the right in Figures 2 and 4 is advancing in the direction of the line of forward flight. Tests and experiments indicate that, under the unequal flight forces on two opposite blades, the advancing blade commences to rise at a point in its rotation about 45° from rearmost position and the retreating blade commences to fall at a point in its rotation approximately 45° from the foremost position. When in the positions of rotation here shown, however, with the blades at 90° from the fore and aft positions, it appears that the advancing blade takes a position, in forward flight, indicated in dotted lines at 14$b$, and the retreating blade will take approximately the position indicated at 14$c$; and hence I predeterminedly fixedly incline the physical axis $x$—$x$ in a direction opposite the normal inclination of the virtual axis, considered laterally of the craft, when in forward flight. This reduces undesirable couples tending to tip the machine which otherwise results when the physical axis is positioned on a true vertical. With the physical axis so inclined, the average line of lift, in forward flight, considered laterally of the machine, will fall close to, but yet slightly to one side of, the vertical, about on the line $t$—$t$, an amount just about sufficient to assist in counter-balancing normal engine torque in forward flight, and yet the line $x$—$x$ does not diverge excessively from a mid position between the two upper fuselage longerons 19. If desired, I may vary this angular deviation, either by bodily offsetting the center $c$ of the rotor slightly to the left (as shown in Fig. 4$a$), or I may vary it with respect to the pylon by altering slightly the angularity of the two pylon legs on one side of the craft, or by altering their point of attachment to the apex structure 20.

With the laterally-tilted axis arrangement as shown in Figures 2 and 4, a plane perpendicular to the axis of the rotor head lies at an inclination (laterally of the craft) with respect to the average plane of the supplemental fixed wings 12, but in fast forward flight the advancing and retreating blades (as seen in dotted lines in Fig. 2) are very nearly equispaced above the fixed wings when they are directly thereabove. This general combination, together with the upturned tips, appears to give good lateral stability in a craft of this character, in which the blades are rotated by the air-flow and are irregularly swung on their pivots by flight forces, and in which there is produced a deflection of air by the rotary wings over the fixed wings.

In mounting the rotor head, I prefer to use a construction (Figs. 3, 4 and 5) which forms not only a mount for said head but an apex or joint structure for the several legs of the pylon, which apex can very easily be made as a bell-like structure 20, conveniently formed as an integral cup-shaped extension of the fixed spindle member 27 of the rotor head. On said spindle suitable bearings 28 may be mounted, around which the axis or hub structure 16 is free to revolve. A brake drum 29 may be mounted on the hub, with which a brake band 30 cooperates, the band 30 and suitable brake operating mechanism (not shown) being fixedly supported as by means of brackets 31 bolted securely to the flange or cup 20 by means of the bolts 32. An internal flange or stiffening web 33, serving also as a support for the tachometer drive structure 34, is also preferably provided. As shown in these figures, I use, in effect, a single cone or shell, and secure the leg end members 35 thereto by means of outer and inner half-cups 36, 37, which may be riveted or bolted together and to the apex 20, as indicated at 38. Between the legs of the pylon, the cone or apex 20 may be cut back as indicated at 39. The entire resultant structure is thus quite stiff and able to stand all the stresses of service while yet being light in weight and simple and inexpensive to manufacture. By a mere deformation of the apex 20 laterally and longitudinally with respect to the craft, or by altering the points or angles of attachment of the legs thereto, the desired angular disposition of the axis may be obtained.

I may, however, make the bell or cone-like apex 20 of a double or hollow construction, (seen in Fig. 4a), as by separating the members 20a and 33a, and mount the leg end members 33a, as by flattening the latter, between the inner and outer shell members 33a and 20a. This produces a particularly sturdy structure. The construction of Figure 4a further illustrates the modification hereinbefore referred to, involving the offsetting of the center c of the rotor laterally from the vertical plane v—v, and an angular inclination of the physical axis x—x just sufficient to bring the line t—t (lift line in forward flight) approximately parallel with the vertical v—v.

In the form shown in Figure 6, I employ a true cone section 20b, on which the leg end members 35b are fastened (their positioning being different at right and left sides, as shown). While the center c of the rotor here lies on the vertical v—v (as it does in Fig. 4) the leg angularity is different. In Figure 6, the leg lines (extended) intersect at center c; in Figure 4 they intersect above that point. In either construction, the point of approximate intersection of the leg lines falls substantially on the average lift line of the rotor, which I have found to be desirable from a stress point of view.

The rotor hub 16, in all forms of the invention, is preferably provided with a conical tip, terminating in a plurality of apertured ears 16a, in like number to the number of blades. Flexible droop cables 16b are provided, one for each blade, to support the same at rest. When the blades cone upwardly in flight, these cables slacken as shown at 16c, and due to this slackening and to the looping of the cables through the apertured ears 16a, full freedom of articulative movement of the blades on their pivots 17 and 18 is permitted.

It is here again noted that to fully attain the desired stability in such a craft, in which the blades assume irregular positions, or travel in an irregular path, as compared with a mean average plane perpendicular to their rotational axis, the direction of rotation of the rotor (viewed in top plan) and the direction of rotation of the tractor propeller (viewed in front elevation) apparently should be the same, with the inclination of said mean average plane downward on the side of the retreating blades. While the construction illustrated is for clockwise rotation, all the arrangements may equally well be oppositely orientated.

Although the rotor ordinarily has four blades, I have, in all views, omitted the near blade, for the sake of clarity of illustration. The invention is not limited, however, to any given number of rotor blades.

In summary, the longitudinal inclination of the physical axis is directed toward the direction of longitudinal inclination of the virtual axis for forward flight, but yet preferably maintained slightly behind the center of gravity; while the lateral inclination of the physical axis is directed opposite to the direction of lateral inclination of the virtual axis for forward flight; and the rotational directions of engine and rotor are preferably inter-related, as well as related to the lateral inclination; all in such manner that stability, control, and counteraction of engine torque, are improved materially. In some cases it has been found that the desired results are attainable by very slight inclinations, for example: as low as ½ to 2 degrees of longitudinal inclination, and as low as 1 to 3 degrees lateral. Considerable variation may be necessary, however, for example: the possible effect of the "twist" of the propeller slip-stream on the rotor, or other effects of flight operation, may require variations in the settings, and I therefore do not desire to limit the scope of this invention, in its broader aspects, to particular degrees of inclination.

What I claim is:—

1. In an aircraft, rotative wing means, a rotative axis member on which said wing means are mounted in position to be aerodynamically actuated by the relative flight wind, and means providing for movement of the wing means at least transversely of their general rotative path under the influence of varying air-flow and other forces in flight, by which arrangement the lift line of the rotative wing means shifts considerably laterally of the center of gravity of the machine toward that side on which the wing means are moving rearwardly, during high speed forward flight of the aircraft, and supplemental fixed wing surfaces set at substantially equal positive dihedral angles at each side of the craft, the axis of the rotative wings being set at a predetermined angle such that a plane perpendicular to said axis is laterally tilted downwardly with respect to the general plane of said fixed wing surfaces at that side of the craft where the rotative wings are retreating with respect to forward flight direction, the degree of tilt of the axis being such that the said lateral offset of the lift line of the rotative wing means toward one side of the center of gravity is reduced in forward flight and passes to the other side of the center of gravity in vertical descent, whereby the average position of the lift line substantially coincides with a longitudinal vertical plane through the center of gravity and the body and fixed wings tend to maintain a substantially horizontal attitude, laterally considered, over most of the range of flight speeds.

2. In an aircraft, the combination of rotative wing means, a rotative axis member on which said wing means are mounted for rotation by relative air-flow, means providing for force-compensating movements of the wing means under the influence of varying forces in flight whereby there is also a lateral shift of the lift line with variation in speed, and rotating means for forward propulsion of the craft, the wing means being set on their axis for a direction of rotation of the wing means (viewed in top plan) which is the same as the direction of rotation of the propulsion means (viewed in front elevation), and the axis of rotation of the wing means being so positioned with respect to the center of gravity of the craft that the shift in said lift line with said given sense of rotation produces a lateral moment on the aircraft substantially counteracting the moment of the propeller torque.

3. In an aircraft, rotative wing means, a rotative axis member on which said wing means are mounted for rotation by relative air-flow, means providing for force-compensating movements of the wing means under the influence of varying forces in flight, and rotating means for forward propulsion of the craft, the direction of rotation of the wing means (viewed in top plan) being the same as the direction of rotation of the propulsion means (viewed in front elevation), and the axis of rotation of the wing means being laterally tilted.

4. In an aircraft, rotative wing means, a rotative axis member on which said wing means are mounted for rotation by relative air-flow, means providing for force-compensating movements of the wing means under the influence of varying forces in flight, and rotating means for forward propulsion of the craft, the direction of rotation of the wing means (viewed in top plan) being the same as the direction of rotation of the propulsion means (viewed in front elevation), and the axis of rotation of the wing means being laterally and longitudinally tilted.

5. In an aircraft, rotative wing means, a rotative axis member on which said wing means are mounted for rotation by relative air-flow, means providing for force-compensating movements of the wing means under the influence of varying forces in flight, and rotating means for forward propulsion of the craft, the direction of rotation of the wing means (viewed in top plan) being the same as the direction of rotation of the propulsion means (viewed in front elevation), and the axis of rotation of the wing means being tilted upwardly and laterally toward the side where the rotative wings are retreating with respect to forward flight direction.

6. In an aircraft, rotative wing means, a rotative axis member on which said wing means are mounted for rotation by relative air-flow, means providing for movement of the wing means at least transversely of their general rotative path under the influence of varying air-flow and other forces in flight, the axis being set at a predetermined lateral angle with respect to a vertical longitudinal plane through the center of gravity of the craft, the several rotative wings being mounted on their axis member with their own longitudinal axes intersecting at a point which lies in said vertical longitudinal plane through the center of gravity.

7. In an aircraft, rotative wing means, a rotative axis member on which said wing means are mounted for rotation by relative air-flow, means providing for movement of the wing means at least transversely of their general rotative path under the influence of varying air-flow and other forces in flight, the axis being set at a predetermined lateral angle with respect to a vertical longitudinal plane through the craft, and a mounting pylon for the rotor, the rotor and its axis and mounting pylon being so arranged that the average lift line of the rotary wings lies substantially centrally of the pylon.

8. In an aircraft of the character described, a fuselage, a rotor with a plurality of blades arranged for air-actuation, a mounting pylon for the rotor including a plurality of legs converging upwardly from the fuselage, and a hollow, double-shelled bell or cone-like apex structure joined to the several legs at their upper ends.

9. In an aircraft of the character described, a fuselage, a rotor with a plurality of blades arranged for air-actuation, a mounting pylon for the rotor including a plurality of legs converging upwardly from the fuselage, and a hollow, double-shelled bell or cone-like apex structure joined to the several legs at their upper ends, the legs being extended between the two bell-like shells and secured to both.

10. In an aircraft, a fuselage, forward propulsion means, a sustaining rotor with a plurality of blades arranged for air actuation and for force-compensating movements, whereby to provide for different styles of flight varying from relatively high speed forward flight to substantially vertical descent, during which the lift line of the rotor shifts forwardly as forward flight speed is increased and rearwardly as substantially vertical descent is approached, a mounting structure for the rotor including a hub above the fuselage in permanently fixed position such that its axis lies in a transverse plane through the aircraft so located with respect to the center of gravity of the craft that the average position of the lift line of the rotor, considered longitudinally of the craft, passes approximately through a transverse horizontal line drawn through the center of gravity.

11. In an aircraft, a fuselage, forward propulsion means, a sustaining rotor with a plurality of blades arranged for air actuation and for force-compensating movements, whereby to provide for different styles of flight varying from relatively high speed forward flight to substantially vertical descent, during which the lift line of the rotor shifts forwardly as forward flight speed is increased and rearwardly as substantially vertical descent is approached, a mounting structure for the rotor including a hub the axis of which lies in such a transverse plane through the aircraft and permanently fixed with respect to the center of gravity of the craft that the average lift line of the rotor moves forwardly of a transverse horizontal line drawn through the center of gravity as forward flight speed is increased.

12. In an aircraft, a fuselage, forward propulsion means, a sustaining rotor with a plurality of blades arranged for air actuation and for force-compensating movements, whereby to provide for different styles of flight varying from relatively high speed forward flight to substantially vertical descent, during which the lift line of the rotor shifts forwardly as forward flight speed is increased and rearwardly as substantially vertical descent is approached, a mounting structure for the rotor including a hub the axis of which lies in a transverse plane through the aircraft so located with respect to the center of gravity of the craft that the average lift line of the rotor moves rearwardly of a transverse horizontal line drawn through the center of gravity as vertical descent is approached.

13. In an aircraft, a fuselage, forward propulsion means, a sustaining rotor with a plurality of blades arranged for air actuation and for swinging movements at least substantially transversely of their general rotative path, whereby to provide for different styles of flight varying from relatively high speed forward flight to substantially vertical descent, during which the lift line of the rotor shifts forwardly as forward flight speed is increased and rearwardly as substantially vertical descent is approached, a mounting structure for the rotor including a hub the axis of which lies in such a transverse plane through the aircraft permanently fixed with respect to the center of gravity of the craft that the average lift line of the rotor moves forwardly of a transverse horizontal line drawn through the center of gravity as forward flight speed is increased and that the average lift line of the rotor moves rearwardly of a transverse horizontal line drawn through the center of gravity as vertical descent is approached.

14. In an aircraft, a fuselage, forward propulsion means, a sustaining rotor with a plurality of blades arranged for air actuation and for swinging movements at least substantially transversely of their general rotative path, whereby to provide for different styles of flight varying from relatively high speed forward flight to substantially vertical descent, during which the lift line of the rotor shifts forwardly as forward flight speed is increased and rearwardly as substantially vertical descent is approached, a mounting structure for the rotor including a hub the axis of which lies in such a transverse plane through the aircraft permanently fixed with respect to the center of gravity of the craft that the average lift line of the rotor moves forwardly of a transverse horizontal line drawn through the center of gravity as forward flight speed is increased and that the average lift line of the rotor moves rearwardly of a transverse horizontal line drawn through the center of gravity as vertical descent is approached, the hub also being disposed so as to position the rotor, transversely of the craft, generally above its center of gravity with said axis tilted upwardly and laterally toward the side of the craft on which the blades retreat in forward flight.

15. In an aircraft, a primary means of sustension comprising a rotor system of rotative sustaining blades or wings mounted for rotation about a generally upright axis, pivot means providing for swinging movements of the wings at least generally transversely of their rotative path of travel, and a mounting structure for the rotor asymmetrically formed to position the rotor axis at a small angle with respect to a longitudinal vertical mid plane through the craft, said mounting structure being further so arranged as to provide a basic support for the rotor of substantially equal width on each side of the average position of the rotor lift line, which lift line shifts laterally toward one side of said average position in vertical descent and toward the other side thereof in high speed forward flight.

16. In an aircraft, forward propulsion means, rotative wing means, a rotative axis member on which the wing means are mounted, and means providing for movement of the wing means at least transversely of their general rotative path under the influence of varying air-flow and other forces in flight, the axis of said member being positioned with the point of intersection of the longitudinal axes of the wing means (when in substantially normal radial position) located in a longitudinal vertical plane containing the center of gravity of the craft, and the axis of said member further being inclined or angled with respect to said plane in a direction opposite to the angularity of the lift line during forward flight induced by the propulsion means.

17. In an aircraft, forward propulsion means, a sustaining rotor comprising an axis or hub structure and sustaining blade or wing means flexibly jointed to the hub structure with freedom for movement generally transversely of the rotative path of travel, in which construction the rotor and the propulsion means provide for substantially vertical descent as well as relatively high speed forward flight and in which construction the lift line of the rotor shifts angularly in accordance with variations in movements of the blade or wing means transversely of the rotative path of travel, and rotor mounting means permanently fixed to position said hub structure slightly rearwardly of a perpendicular drawn through the center of gravity of the craft, whereby, during relatively steep or vertical descent, the craft will adopt a small forward gliding attitude.

18. In an aircraft, a body, a rotative hub structure mounted thereabove, a plurality of wings positioned for autorotation about the axis of said hub structure, pivot means for mounting said wings on the hub structure providing for movements of said wings in addition to their rotative movement, to compensate for variations in flight forces especially as between vertical descent and high speed forward flight, by which construction the lift line of the set of rotary wings taken as a whole tends to shift forwardly and laterally to one side with increasing forward speed of the craft relative to the air, and a structure for mounting the hub above the body constructed to predeterminedly locate the physical axis of rotation of the hub on a line which passes approximately vertically slightly behind the center of gravity of the craft, longitudinally considered, and slightly laterally of the center of gravity of the craft on the side opposite to that side toward which the lift line tends to shift in forward flight, whereby the lift line of the rotor passes slightly to the rear and to one side of the center of gravity of the craft when in vertical descent, and passes to the front and slightly to the opposite side of the center of gravity of the craft in high speed forward flight.

19. In an aircraft, a body, a rotative hub structure mounted thereabove, a plurality of wings positioned for autorotation about the axis of said hub structure, pivot means for mounting said wings on the hub structure providing for movements of said wings in addition to their rotative movement, to compensate for variations in flight forces especially as between vertical descent and high speed forward flight, by which construction the lift line of the set of rotary wings taken as a whole tends to shift forwardly and laterally to one side with increasing forward speed of the craft relative to the air, and a structure for mounting the hub above the body constructed to predeterminedly locate the physical axis of rotation of the hub on a line which passes approximately vertically slightly behind the center of gravity of the craft, longitudinally considered, and slightly laterally of the center of gravity of the craft on the side opposite to that side toward which the lift line tends to shift in forward flight, whereby the lift line of the rotor passes slightly to the rear and to one side of the center of gravity of the craft when in vertical descent, and passes to the front and slightly to the opposite side of the center of gravity of the craft in high speed forward flight, and means of forward propulsion of the craft the center of rotation of which lies in a horizontal plane below that of the center of gravity of the craft, the axis of the propulsion means being further disposed to substantially intersect a horizontal transverse line through the center of gravity of the craft, whereby the conditions of balance characteristic of the said location of the rotor axis are maintained throughout the range of flight speeds of the craft and operating speeds of the forward propulsion means.

JUAN DE LA CIERVA.

CERTIFICATE OF CORRECTION.

Patent No. 1,949,296. February 27, 1934.

JUAN de la CIERVA.

It is hereby certified that error appears in the printed specification of the above numbered patent requiring correction as follows: Page 4, line 131, claim 2, before "speed" insert forward; page 5, line 121, claim 12, for "n" read in such, and lines 121 and 122, for "so located" read and permanently fixed; and that the said Letters Patent should be read with these corrections therein that the same may conform to the record of the case in the Patent Office.

Signed and sealed this 24th day of April, A. D. 1934.

Bryan M. Battey (Seal)

Acting Commissioner of Patents.